United States Patent [19]

Fujita et al.

[11] 4,287,799

[45] Sep. 8, 1981

[54] ROLLER APPARATUS FOR CUTTING GLASS FIBERS

[75] Inventors: Toshihito Fujita; Toshiaki Kikuchi; Koji Nakazawa, all of Fukushima, Japan

[73] Assignee: Nitto Boseki Co., Ltd., Fukushima, Japan

[21] Appl. No.: 816,766

[22] Filed: Jul. 18, 1977

[30] Foreign Application Priority Data

Jul. 20, 1976 [JP] Japan .................................. 51-86356

[51] Int. Cl.³ .............................................. D01G 1/04
[52] U.S. Cl. ........................................ 83/347; 83/913
[58] Field of Search ................ 83/339, 347, 346, 345, 83/913; 65/2, 11 R

[56] References Cited

U.S. PATENT DOCUMENTS

| | | | |
|---|---|---|---|
| 1,693,589 | 12/1928 | Bolton | 83/346 X |
| 3,644,109 | 2/1972 | Klink et al. | 83/347 X |
| 3,668,964 | 6/1972 | Lomas | 83/347 |
| 3,776,084 | 12/1973 | Slyvakov | 83/346 X |
| 3,869,268 | 3/1975 | Briar et al. | 83/347 X |
| 3,992,967 | 11/1976 | Fram | 83/347 |

*Primary Examiner*—Frank T. Yost
*Attorney, Agent, or Firm*—Gerald J. Ferguson, Jr.; Joseph J. Baker

[57] ABSTRACT

A cutting roller 2 of a glass filament chopping apparatus mounts a plurality of spaced, axially parallel cutting blades 19 held in receiving grooves 20 by retainer strips 21. The peripheral flange surfaces 24, 25 of the cutting roller on the opposite ends of the roller drum 18 are raised to almost the radius of the cutting blade edges, and serve as driving engagement surfaces when the rotating cutting roller is biased into contact with a feed roller 1.

2 Claims, 5 Drawing Figures

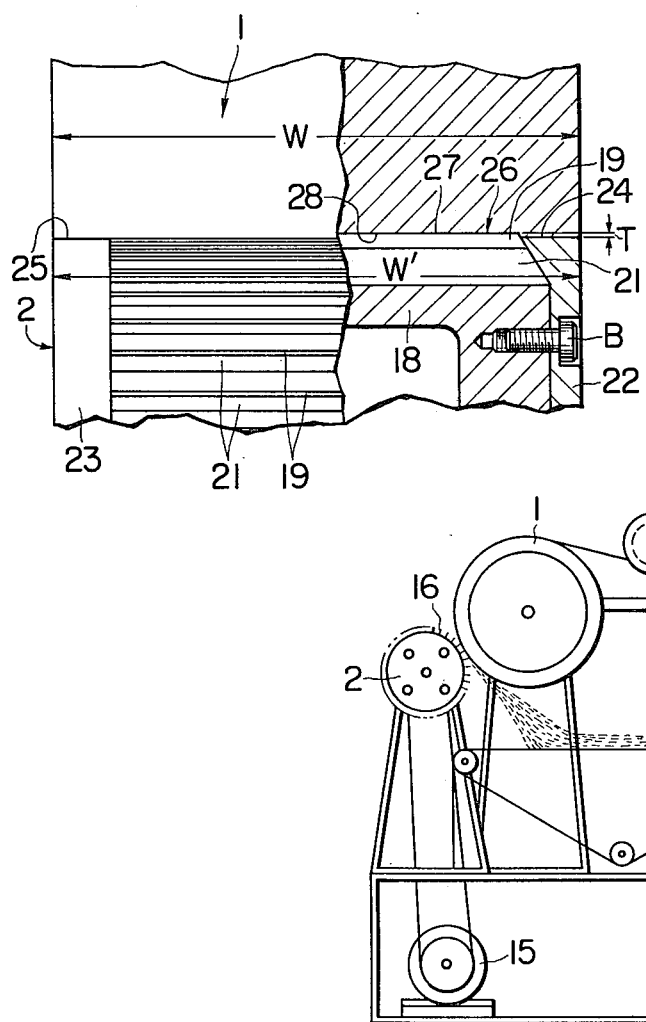

ROLLER APPARATUS FOR CUTTING GLASS FIBERS

BACKGROUND OF THE INVENTION

This invention relates to a roller apparatus for chopping a strand of glass filaments into relatively long fibers.

In the chopping of fibers from a strand of glass filaments according to the prior art, a plurality of cutting blades 3 are fixedly secured to a driven roller 2 at intervals corresponding to the length of the chopped fibers, as generally shown in FIG. 5. The edges 4 of the cutting blades 3 abut against and penetrate into a resilient feed roller 1, whereby the strand is chopped into fibers and the feed roller is simultaneously driven. To implement the rotation of the feed roller at a constant speed, the cutting blades are disposed at an angle $\alpha$ with the axis of the cutting roller 2, whereby the feed roller is always engaged by at least two cutting blades in a progressive manner and smoother power transmission is obtained.

Recently, a demand has arisen for relatively long chopped fibers. If the cutting length or distance between the adjacent blades 3 is increased beyond about 13 mm, however, the blades intermittently strike against or engage the feed roller 1 which generates impact vibrations. This causes accelerated wear and deterioration of the synthetic resin or rubber feed roller and damages the edges of the cutting blades.

To overcome this difficulty the height of the cutting blades has been reduced, as shown in FIG. 5, and the peripheral surface 6 of the cutting roller drum 5 is brought into driving contact with the feed roller 1 between the cutting blades as the latter penetrate into the feed roller surface 7. When the strand filaments are still soft, however, the cross-sectional area of the fibers is compressively flattened by the contact pressure, and the cut or chopped fibers tend to stick onto the cutting and feed roller surfaces 6, 7.

It has also been attempted to drivingly couple the feed roller 1 directly to the cutting roller 2 through a separate power transmission, but it is very difficult to revolve the two rollers at exactly equal circumferential speeds owing to the slippage between the various drive train components. Furthermore, the feed roller surface 7 is inherently damaged and worn by repeated contact with the cutting blades, and must be periodically remachined or resurfaced, as a result of which its outside diameter changes. After such maintenance or restoration, it is very difficult to reestablish the drive coupling such that the two rollers rotate at equal circumferential speeds.

SUMMARY OF THE INVENTION

Briefly, and according to the present invention, the drawbacks and disadvantages of the prior art are effectively overcome by providing a cutting roller for a glass filament chopping apparatus which mounts a plurality of spaced, axially parallel cutting blades held in receiving grooves by retainer strips. The peripheral flange surfaces of the cutting roller on the opposite ends of the roller drum are raised to almost the radius of the cutting blade edges, and serve as driving engagement surfaces when the rotating cutting roller is biased into contact with a filament strand feed roller. Since the cutting blades serve only to chop or sever the strand filaments into fibers of predetermined length and do not implement any feed roller drive function, their depth of penetration into the feed roller surface can be shortened as compared with the prior art, creases the operating life of both the feed roller cutting blades.

BRIEF DESCRIPTION OF THE DRAWINGS

In the drawings

FIG. 1 shows a schematic side view of an apparatus for continuously manufacturing chopped glass fiber strands in which the cutting roller of this invention may be employed, FIG. 2 shows a front view, with parts cut away, of a feed roller and cutting roller according to one embodiment of this invention.

DETAILED DESCRIPTION OF THE PREFERRED EMBODIMENTS

Figure 3:
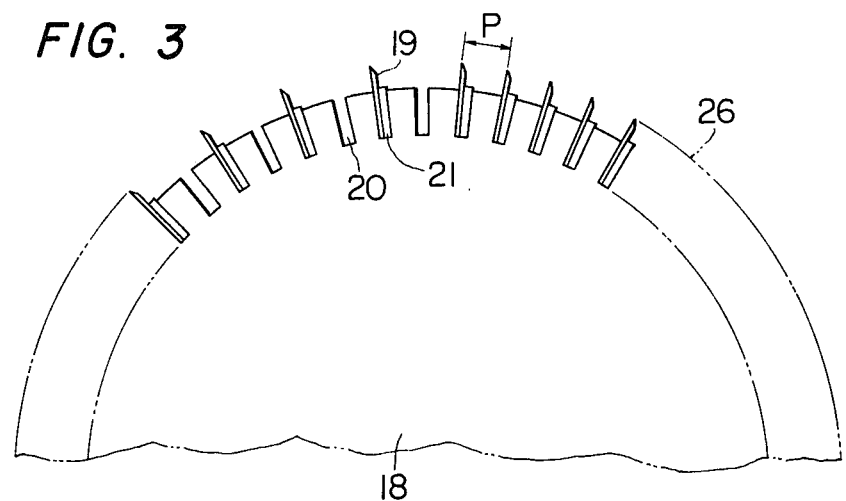
FIG. 3 shows a simplified side view of the cutting roller of FIG. 2.

Referring now to drawings, in the chopped fiber manufacturing apparatus shown in FIG. 1 a plurality of glass filaments 10 drawn out of the nozzles 9 of a glass melting furnace 8 are coated with a wetting agent or the like by a roller 11, gathered into a flattened strand 13 by a collecting roller 12, and fed over the feed roller 1 by a guide roller 14. The feed roller is made of a resilient or elastic material, such as synthetic resin or rubber, which has a high frictional coefficient with respect to glass fibers. The feed roller abuts against a cutting roller 2 as described above, and the cutting roller is belt driven by an electric motor 15 and biased against the feed roller by a fluid pressure device, not shown. The strand 13 is cut or chopped by the blades of the roller 2 into fibers C of a predetermined length, which are accumulated on a conveyor belt 17.

As shown in FIGS. 2 and 3, grooves 20 are provided in the peripheral surface of the cutting roller drum 18 at predetermined intervals P. Each cutting blade 19 is inserted into a groove 20 and held therein by a retainer strip 21. Flange plates 22 and 23 are secured to both ends of the drum 18 by bolts B, and extend angularly inward to thus hold the cutting blades 19 and retainers 21 in the grooves 20.

The external surfaces 24 and 25 of the flange plates 22 and 23 form part of the peripheral surface of the cutting roller 2, and serve as driving surfaces for the feed roller 1. The cutting blades 19 extend outwardly between the two flange plates a distance T, and define a cutting surface 16. The edge 27 of each cutting blade thus penetrates into the peripheral surface 28 of the feed roller 1 a depth T to sever the glass fibers from the strand 13.

The width W of the feed roller 1 is made at least equal to the width W' of the cutting roller 2 including the flange plates 22 and 23, so that the driving surfaces 24 and 25 are fully and positively engaged by the peripheral surface of the driven feed roller. The surfaces 24 and 25 are preferably roughened to insure good gripping and preclude any slippage.

Figure 5:
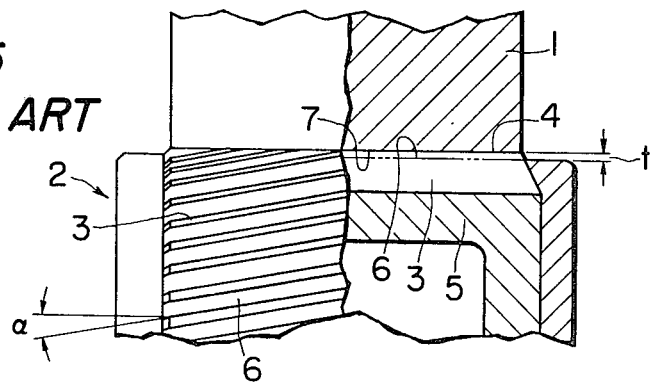
FIG. 5 shows a front view, with parts cut away, of a conventional feed roller and cutting roller apparatus.

Since the transmission of rotating power to the feed roller is entirely carried out by the surfaces 24 and 25 of the flange plates 22 and 23, the cutting blades 19 need penetrate into the peripheral surface 28 of the feed roller to only a depth T, which is quite sufficient to chop the strand filaments. The depth T is much less than the corresponding penetration depth t required in the prior art roller of FIG. 5 where the cutting blades must also implement the feed roller drive function, whereby the life of the feed roller and cutting blades is significantly increased.

Figure 4:
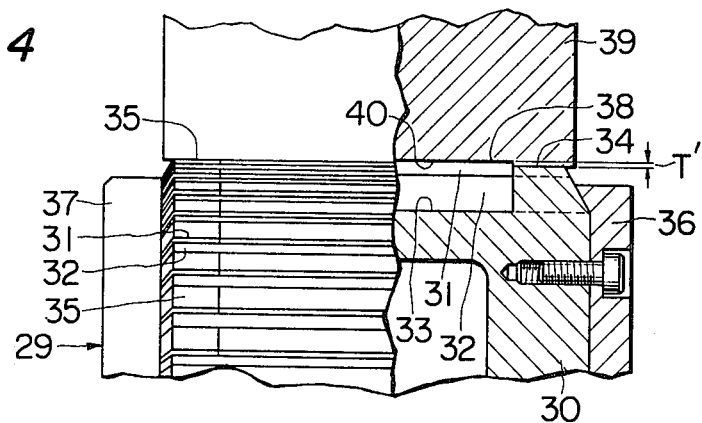
FIG. 4 shows a front view, with parts cut away, of a feed roller and cutting roller according to another embodiment of this invention.

In the embodiment shown in FIG. 4, flange surfaces 34 and 35 are formed on the outer edges of the drum 30 of a cutting roller 29 such that they are in continuity with grooves 33 for receiving cutting blades 31 and retainer strips 32. The blades and retainer strips are also held on the cutting roller drum 30 by side plates 36 and 37, and the edge portion 38 of each cutting blade protrudes radially outwardly between the flange surfaces a distance T′ whereby the blade edges penetrate into the peripheral surface 40 of a feed roller 39 to sever or chop the strand filaments. Once again, the transmission of rotary power to the feed roller 39 is effected only through its frictional contact with the flange surfaces 34, 35.

By reason of the separate chopping and drive functions implemented by the cutting blades and flange surfaces, respectively, equal circumferential rotation speeds of the feed roller and cutting roller are positively achieved, and vibrations due to the impact of the cutting blades on the feed roller are greatly reduced, even at high operating speeds. Furthermore, the feed roller is smoothly and positively driven regardless of the length of the chopped fibers, and the distance between adjacent cutting blades can therefore be selected as desired over a wide range, in excess of 50 mm, for example, without reducing productivity.

What is claimed is:

1. In a cutting roller for directly chopping wet continuous elongated filaments which are drawn from a bushing into finite fibers of predetermined length including a driven cutting roller drum mounting a plurality of spaced, parallel, radially outwardly extending cutting blades and adapted to be biased into driving and filament cutting engagement with the resilient outer peripheral surface of a filament feed roller, the improvements characterized by:

(a) said cutting rollerdrum comprising a main body having axial slots in the surface thereof for receiving cutting blades and retainer strips, and cylindrical flange plates removably attached to the opposite ends of said main body, each said flange plate having a diameter greater than that of said main body and a flat cylindrical surface, the inner surface of said flange plate inclined inwardly at the part extending radially past the circumference of said main body, (b) a plurality of retainer strips associated with said cutting blades, respectively, said retainer strips and cutting blades being held in said axial slots by said inwardly inclined surfaces of said flange plates, and (c) the width of the feed roller being at least equal to that of the cutting roller including the flat cylindrical surfaces of said flange plates, whereby the flat cylindrical surfaces of said flange plates frictionally contact and drivingly engage the opposite ends of the outer peripheral surface of the feed roller, and the cutting blades penetrate into the resilient outer peripheral surface of the feed roller to a depth just sufficient to implement filament chopping.

2. A cutting roller as defined in claim 1, wherein the flange surfaces are roughened to implement good frictional driving contact with the feed roller surface, and the cutting blades are parallel to the axis of the cutting roller.

* * * * *